United States Patent
Thornton

(10) Patent No.: US 8,759,750 B2
(45) Date of Patent: Jun. 24, 2014

(54) NEUTRON-GENERATOR-BASED THERMAL NEUTRON POROSITY DEVICE WITH HIGH POROSITY SENSITIVITY

(75) Inventor: James L. Thornton, East Windsor, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 13/128,370

(22) PCT Filed: Nov. 17, 2009

(86) PCT No.: PCT/US2009/064809
§ 371 (c)(1),
(2), (4) Date: Aug. 19, 2011

(87) PCT Pub. No.: WO2010/059632
PCT Pub. Date: May 27, 2010

(65) Prior Publication Data
US 2011/0297818 A1    Dec. 8, 2011

Related U.S. Application Data

(60) Provisional application No. 61/115,670, filed on Nov. 18, 2008.

(51) Int. Cl.
*G01V 5/10*      (2006.01)

(52) U.S. Cl.
USPC ........................................................ 250/269.4

(58) Field of Classification Search
USPC ........................................................ 250/269.4
See application file for complete search history.

(56) References Cited

U.S. PATENT DOCUMENTS 4,760,252 A * 7/1988 Albats et al. ............. 250/390.07

FOREIGN PATENT DOCUMENTS

| EP | 0436990 A2 | 7/1991 |
| GB | 2320958 A | 7/1998 |

* cited by examiner

*Primary Examiner* — David Porta
*Assistant Examiner* — Hugh H Maupin
(74) *Attorney, Agent, or Firm* — Jeremy Berman

(57) ABSTRACT

Systems, methods, and devices for determining porosity with high sensitivity are provided. In one example, a downhole tool with such high porosity sensitivity may include a neutron source, a near neutron detector, and a far neutron detector. The neutron source may emit neutrons into the subterranean formation, which may scatter and be detected by the near and far detectors. The near neutron detector may be disposed near enough to the neutron source to detect a maximum number of neutrons when the porosity of the subterranean formation is greater than 0 p.u.

22 Claims, 16 Drawing Sheets

NEUTRON-GENERATOR-BASED THERMAL NEUTRON POROSITY DEVICE WITH HIGH POROSITY SENSITIVITY

RELATED APPLICATIONS

This application claims the benefit of U.S. Provisional Application No. 61/115,670, filed on Nov. 18, 2008.

BACKGROUND

The present disclosure relates generally to downhole tools for neutron well logging and, more particularly, to neutron detector configurations for such downhole tools.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Downhole tools for neutron well logging have been used in oilfield settings for many years to measure formation porosity and as gas and lithology indicators. These downhole tools have historically included a radioisotopic neutron source, such as AmBe, which emits neutrons into the surrounding formation. The neutrons may interact with the formation before being subsequently detected in neutron count rates by one or more neutron detectors. Among other things, the neutron count rates may be sensitive to hydrogen in formation pore spaces. As such, the neutron count rates may be employed to determine a porosity of the formation.

Unfortunately, besides hydrogen in the formation pore spaces, detector count rates are also sensitive to other borehole and formation properties, collectively referred to as environmental effects, such as borehole size and fluid salinity. The magnitude of these effects depends on detector spacing as does the porosity sensitivity. Relatively speaking, the former are more significant compared to the latter at shorter spacings. Traditional designs employ this fact by determining porosity from the ratio of a near and far detector count rates. By deriving porosity from such a ratio, a number of undesirable effects such as the former are substantially reduced, albeit at the loss of some porosity sensitivity.

Moreover, in some instances, a radioisotopic neutron source may be undesirable for a variety of reasons. For example, the use of a radioisotopic source may involve negotiating burdensome regulations, the sources may have limited useful lives (e.g., 1 to 15 years), and the strength of the sources may need monitoring. Moreover, radioisotopic sources are becoming more expensive and more difficult to obtain. When alternative neutron sources, such as electronic neutron generators, are used in place of a radioisotopic neutron source, the response of the neutron detectors may not enable traditional neutron porosity determination. This may occur because the higher neutron energy of an electronic neutron source may produce a dramatic loss in porosity sensitivity, and hence measurement quality, at high porosities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for determining porosity with high sensitivity. In one example, a downhole tool with such high porosity sensitivity may include a neutron source, a near neutron detector, and a far neutron detector. The neutron source may emit neutrons into the subterranean formation, which may scatter and be detected by the near and far detectors. The near neutron detector may be disposed near enough to the neutron source to detect a maximum number of neutrons when the porosity of the subterranean formation is greater than 0 p.u.

BRIEF DESCRIPTION OF THE DRAWINGS

Various aspects of this disclosure may be better understood upon reading the following detailed description and upon reference to the drawings in which.

DETAILED DESCRIPTION

Figure 1:
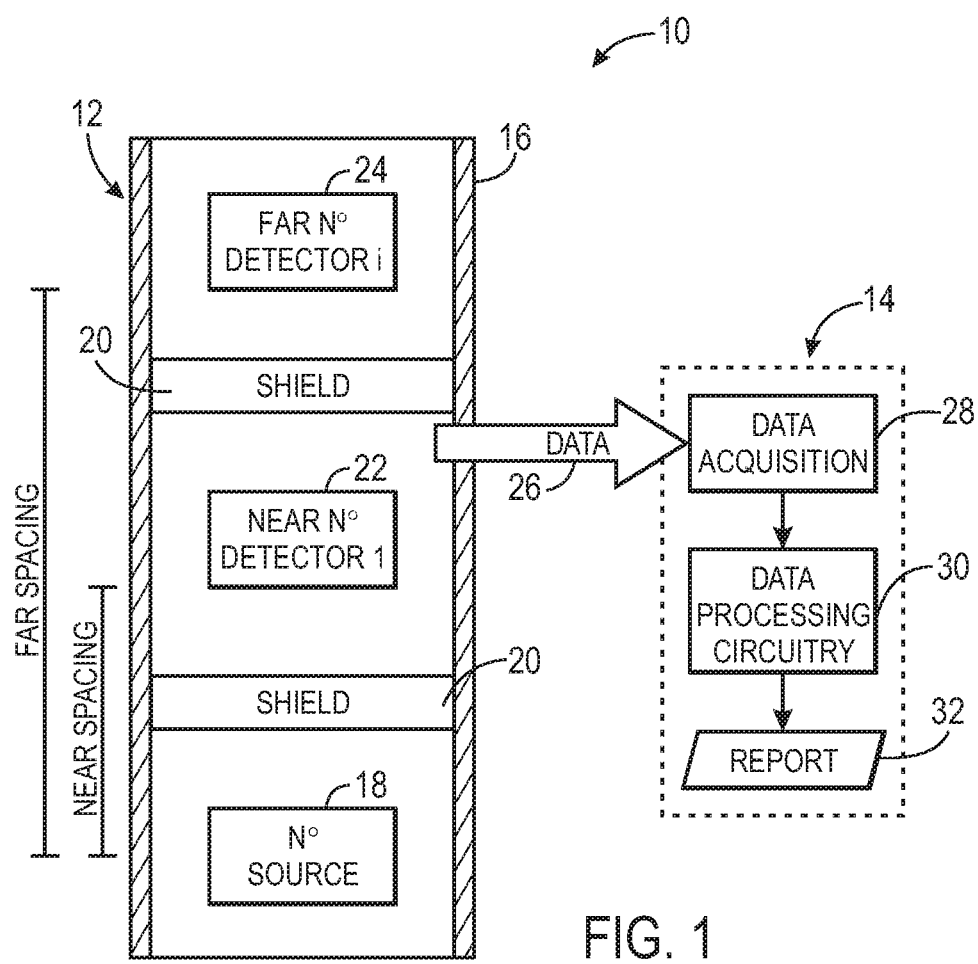
FIG. 1 is a schematic diagram of a neutron well logging system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to downhole neutron well logging tools. When such a downhole tool is placed into a subterranean formation, and a neutron source of the downhole tool emits neutrons into the formation, the interactions of the neutrons with the subterranean formation and borehole may vary depending on certain properties of the subterranean formation and borehole. For example, when a subterranean formation includes more hydrogen or more porosity, and the porosity of the formation is filled with water or hydrocarbons, neutrons may lose more energy before reaching a given neutron detector of the downhole tool. In some cases, the neutrons may not reach the neutron detector due to these interactions. When the downhole tool includes at least two neutron detectors at different spacings from the neutron source (generally referred to as a "near" neutron detector and a "far" neutron detector), the quantity of neutrons that may reach the far neutron detector may decrease relative to the quantity that reach the near neutron detector when porosity and/or hydrogen index of the subterranean formation is relatively higher.

The present disclosure describes a configuration for spacing a near neutron detector and far neutron detector in a downhole neutron well logging tool. In certain embodiments, the downhole tool may employ a 14-MeV neutron generator or similar neutron source. In particular, the 14-MeV neutron source produces higher-energy neutrons than a traditional AmBe neutron source. Though unintuitive and unexpected, the present disclosure provides modeled data illustrating that a near neutron detector located very close to the neutron source (e.g., 10 inches or less from the neutron source to the front face of the active region of the neutron detector) may provide high-porosity-sensitivity measurements of a subterranean formation, despite that one would probably expect to move the neutron detector farther, not nearer, when the energy of the neutrons emitted from the neutron source is increased. This may occur because, when the near neutron detector has a very close spacing to the source, many neutrons reaching the detector may have energies above those the neutron detector is configured to efficiently detect and hence may pass through the detector undetected. At low porosities, the average distance traveled by a neutron until it reaches epithermal or thermal energies, and thus becomes efficiently detectable by such a neutron detector, e.g. He3, is much longer. This means that the cloud of detectable low energy neutrons is larger under such conditions. At such a close spacing, the near neutron detector will therefore see an increase in the low energy neutron flux as the porosity increases and the neutron cloud decreases in size, shrinking towards the detector. At higher porosities, the extent of the neutron cloud may eventually decrease to the point where it is smaller than the near detector spacing. Further increases in porosity may result in the detectable neutron cloud shrinking inward, away from the detector at which point the detected neutron flux will decrease with further increases in porosity, as is the traditional case. As described below, a downhole tool taking advantage of this effect may provide relatively high porosity sensitivity.

With the foregoing in mind, FIG. 1 illustrates a neutron well logging system 10 for determining a porosity of a subterranean formation with high sensitivity. The neutron well logging system 10 may include a downhole tool 12 and a data processing system 14. Although the downhole tool 12 and the data processing system 14 are illustrated as separate from one another, the data processing system 14 may be incorporated into the downhole tool 12 in certain embodiments. The downhole tool 12 may be a slickline or wireline tool for logging an existing well, or may be installed in a borehole assembly (BHA) for logging while drilling (LWD).

The downhole tool 12 may be encased within a housing 16 that houses, among other things, a neutron source 18. The neutron source 18 may include a neutron source capable of emitting relatively high-energy neutrons, such as 14 MeV neutrons. By way of example, the neutron source 18 may be an electronic neutron source, such as a Minitron™ by Schlumberger Technology Corporation, which may produce pulses of neutrons through d-T reactions. Additionally or alternatively, the neutron source 18 may be a radioisotopic source that emits higher-energy neutrons than AmBe. In one embodiment, the neutron source 18 may be an electronic neutron source, such as the Minitron™, that does not include a separate radioisotopic neutron source, such as AmBe.

A neutron shield 20 may or may not separate the neutron source 18 from a "near" neutron detector 22, which is located more closely to the neutron source 18 than a similar "far" neutron detector 24. In some embodiments, similar neutrons shields may also be placed between the neutron detectors 22 and 24 and the borehole-facing side of the downhole tool 12. This may reduce the number of neutrons that may reach the neutron detectors 22 and 24 via the borehole, versus those reaching the detector via the formation, thus increasing the sensitivity of the downhole tool 12 to formation properties versus those of the borehole. In certain embodiments, the near neutron detector 22 and the far neutron detector 24 may be any neutron detectors capable of detecting thermal neutrons, but which may be relatively insensitive to high energy neutrons, such as those emitted by the neutron source 18. In general, the neutron detectors 22 and 24 may be configured substantially not to detect neutrons having an energy, for example, of 1 keV or greater. In some embodiments, the neutron detectors 22 and 24 may be $^3$He neutron detectors. In certain other embodiments, the near neutron detector 22 and the far neutron detector 24 may be capable of detecting epithermal neutrons, but similarly may be relatively insensitive to the high energy neutrons emitted by the neutron source 18. Because the near neutron detector 22 may be relatively insensitive to the high energy neutrons of the neutron source 18, in some embodiments, the near neutron detector 22 may not be shielded from the neutron source 18. If no neutron shield 20 separates the near neutron detector 22 from the neutron source 18, most neutrons emitted directly from the neutron source 18 may pass undetected through the near neutron detector 22, and substantially the only neutrons detectable to the near neutron detector 22 may be those that have been scattered by the surrounding formation and/or borehole.

The near neutron detector 22 may have a "near spacing" measured from the neutron source 18 to the face of the active region of the near neutron detector 22 nearest to the neutron source 18, and the far neutron detector 24 may have a "far spacing" measured from the neutron source 18 to the face of the active region of the far neutron detector 24 nearest to the neutron source 18. In general, the far spacing may be the same as employed in traditional downhole tools configured for neutron well logging. However, the near neutron detector 22 may have a near spacing much closer to the neutron source 18 than traditional configurations. The near spacing may be chosen such that, at low porosities, many of the neutrons that reach the near neutron detector 22 either directly from the neutron source or after interacting with the subterranean formation, borehole and/or within the device itself have energies too high to detect. At relatively higher porosities, due to the additional scattering off of hydrogen nuclei, the number of lower-energy, detectable neutrons may increase, as the distance the neutrons travel before being slowed to these energies decreases. At higher porosities still, the additional scattering off hydrogen may eventually reduce the number of neutrons of any energy that reach the detector, but not before resulting in a porosity response that is relatively flat or even increasing over part of the porosity range. For a given embodiment of the downhole tool 12, the exact optimal spacing will depend on specific details of the design of the downhole tool 12, including the size and efficiency versus energy of the neutron detector 22, and where, what kind, and how much neutron shielding is used. The near neutron detector 22 may be spaced such that its porosity response may be relatively flat and/or increasing as porosity increases.

Such a near spacing may be less than one foot from the neutron source 18. It is believed that a spacing less than approximately 9 inches between the neutron source 18 and the front face of the near neutron detector 22 may be optimal for a 14 MeV neutron source. While the porosity sensitivity may continue to improve as the spacing decreases, other tool design considerations, e.g. physical space constraints and/or standoff sensitivity may set a practical minimum spacing.

When the downhole tool is used in a subterranean formation, as generally described below with reference to FIG. 2, the near neutron detector 22 may detect a different number of neutrons than the far neutron detector 24 depending on the various properties of the surrounding formation and due to differences, e.g. size, in the neutron detectors 22. The responses that result from measuring the counts of the neutrons at the near neutron detector 22 and far neutron detector 24 may be transferred as data 26 to the data processing system 14. The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality. For example, processing may take place at least in part by an embedded processor in the downhole tool 12.

In general, the data processing system 14 may include data acquisition circuitry 28 and data processing circuitry 30. The data processing circuitry 30 may be a microcontroller or microprocessor, such as a central processing unit (CPU), which may execute various routines and processing functions. For example, the data processing circuitry 28 may execute various operating system instructions as well as software routines configured to effect certain processes. These instructions and/or routines may be stored in or provided by a manufacture, which may include a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 30 may process data provided as inputs for various routines or software programs, including the data 26.

Such data associated with the present techniques may be stored in, or provided by, a memory or mass storage device of the data processing system 14. Alternatively, such data may be provided to the data processing circuitry 30 of the data processing system 14 via one or more input devices. In one embodiment, data acquisition circuitry 28 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 26 to the data acquisition circuitry 28 of the data processing system 14 via, for example, internal connections with the tool, a telemetry system communication downlink or a communication cable. After receiving the data 26, the data acquisition circuitry 28 may transmit the data 26 to the data processing circuitry 30. In accordance with one or more stored routines, the data processing circuitry 30 may process the data 26 to ascertain one or more properties of a subterranean formation surrounding the downhole tool 12, such as porosity. Such processing may involve, for example, determining an apparent porosity from the ratio of counts in a near detector to those in a far detector. The data processing circuitry 30 may thereafter output a report 32 indicating the one or more ascertained properties of the formation. The report 32 may be stored in memory or may be provided to an operator via one or more output devices, such as an electronic display and/or a printer.

Figure 2:
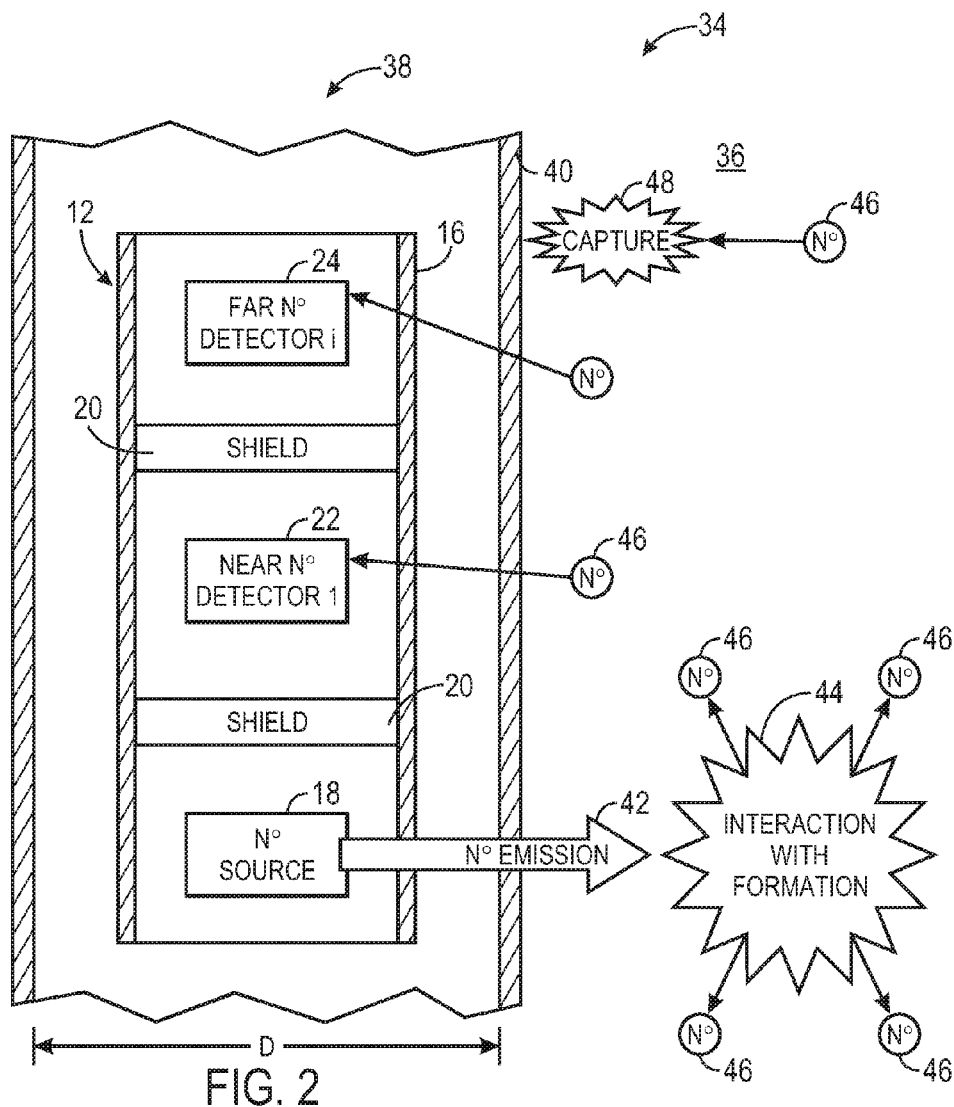
FIG. 2 is a schematic diagram of a neutron well logging operation involving the neutron well logging system of FIG. 1, in accordance with an embodiment.

FIG. 2 represents a well logging operation 34 using the downhole tool 12 to ascertain a property of a subterranean formation 36, such as porosity. As illustrated in FIG. 2, the downhole tool 12 may be lowered into a borehole 38 in the subterranean formation 36, which may or may not be cased in a casing 40. The borehole 38 may have a diameter D, which may impact the neutron counts detected by the downhole tool 12, as discussed below. After placement into the subterranean formation 36, a neutron emission 42 from the neutron source 18 may have various interactions 44 with elements of the subterranean formation 36 and/or the borehole 38. By way of example, when the neutron source includes an electronic neutron generator, the neutron emission 42 may be a neutron burst containing 14-MeV neutrons.

The interactions 44 of the neutron emission 42 with elements of the subterranean formation 36 and/or the borehole 38 may include, for example, inelastic scattering, elastic scattering, and neutron capture. The interactions 44 may result in neutrons 46 from the neutron emission 42 traveling through the subterranean formation 36 or borehole 38 and reaching neutron detectors 22 and/or 24 at lower energies than when first emitted. Depending on the composition of the subterranean formation 36 and the borehole 38, the interactions 44 may vary. For example, hydrogen atoms may cause elastic scattering. Similarly, chlorine atoms found in salt in the subterranean formation 36 or borehole fluid may cause neutron capture events 48 for certain of the neutrons 46 after the neutrons 46 have reduced in energy below approximately 0.1 eV. The numbers and energies of the neutrons 46 that reach the neutron detectors 22 and 24 at different distances from the neutron source 18 may thus vary based at least in part on properties of the subterranean formation 34. Based on a ratio of counts of neutrons 46 from the near neutron detector 22 and the far neutron detector 24, the data processing system 14 may ascertain the porosity of the subterranean formation 36 using any suitable technique.

Figure 3:
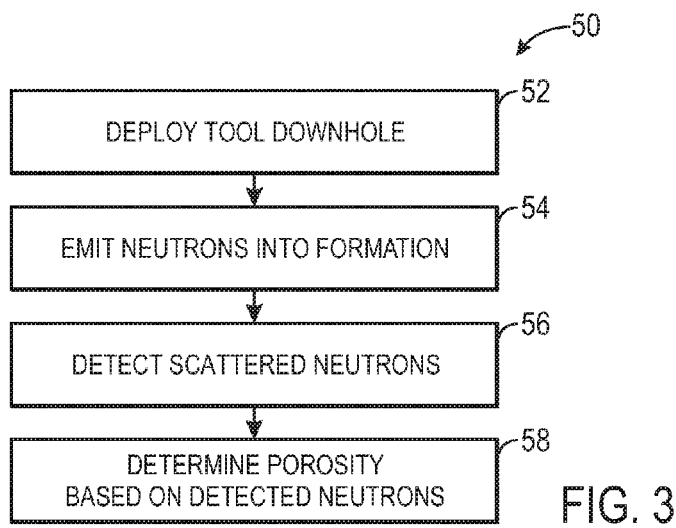
FIG. 3 is a flowchart describing an embodiment of a method for carrying out the neutron well logging operation of FIG. 2.

FIG. 3 is a flow chart 50 representing an embodiment of a method for performing the neutron well logging operation 34 of FIG. 2. In a first step 52, the downhole tool 12 may be deployed into the subterranean formation 36 on a wireline, slickline, or while the borehole 38 is being drilled by a borehole assembly (BHA). In step 54, the neutron source 18 may emit neutrons (illustrated as neutron emission 42 in FIG. 2) into the surrounding formation 36. The neutron emission may be in bursts of neutrons or as a continuous stream of neutrons. Based on the interactions 44 of the emitted neutrons 42 with elements of the subterranean formation 36, varying numbers of neutrons may reach the near neutron detector 22 and the far neutron detector 24. As such, in step 56, the near neutron detector 22 and the far neutron detector 24 may respectively detect the differing quantity of neutrons that reach these detectors. In step 58, based on the neutron counts obtained by the near neutron detector 22 and the far neutron detector 24, the data processing system 14 may determine a measurement of formation 36 porosity using any suitable technique.

FIGS. 4-18 represent plots comparing the results obtained using a traditional AmBe neutron well logging downhole tool and using the downhole tool 12 of FIG. 1 with various near spacing and far spacings. These plots are intended to illustrate that the disclosed downhole tool 12, having neutron shields placed between the neutron detectors 22 and 24 the borehole-facing side of the downhole tool 12, and having suitably spaced near and far neutron detectors 22 and 24, may enable porosity measurements of a subterranean formation 36 in much the same manner as a traditional AmBe neutron well logging downhole tool. In many cases, the downhole tool may provide a higher porosity sensitivity. The plots illustrated in FIGS. 4-18 have been modeled using the Monte Carlo N-Particle transport code, (MCNP), a leading nuclear Monte Carlo modeling code. It should be appreciated that, among other things, detector size, neutron source strength, and shielding are different in the modeled AmBe neutron source downhole tool from the modeled downhole tool 12. As such, while these variables may influence the absolute count rates in embodiments of the downhole tool 12, the relative shape of the responses may enable the capabilities of the downhole tool 12 disclosed herein.

Figure 4:
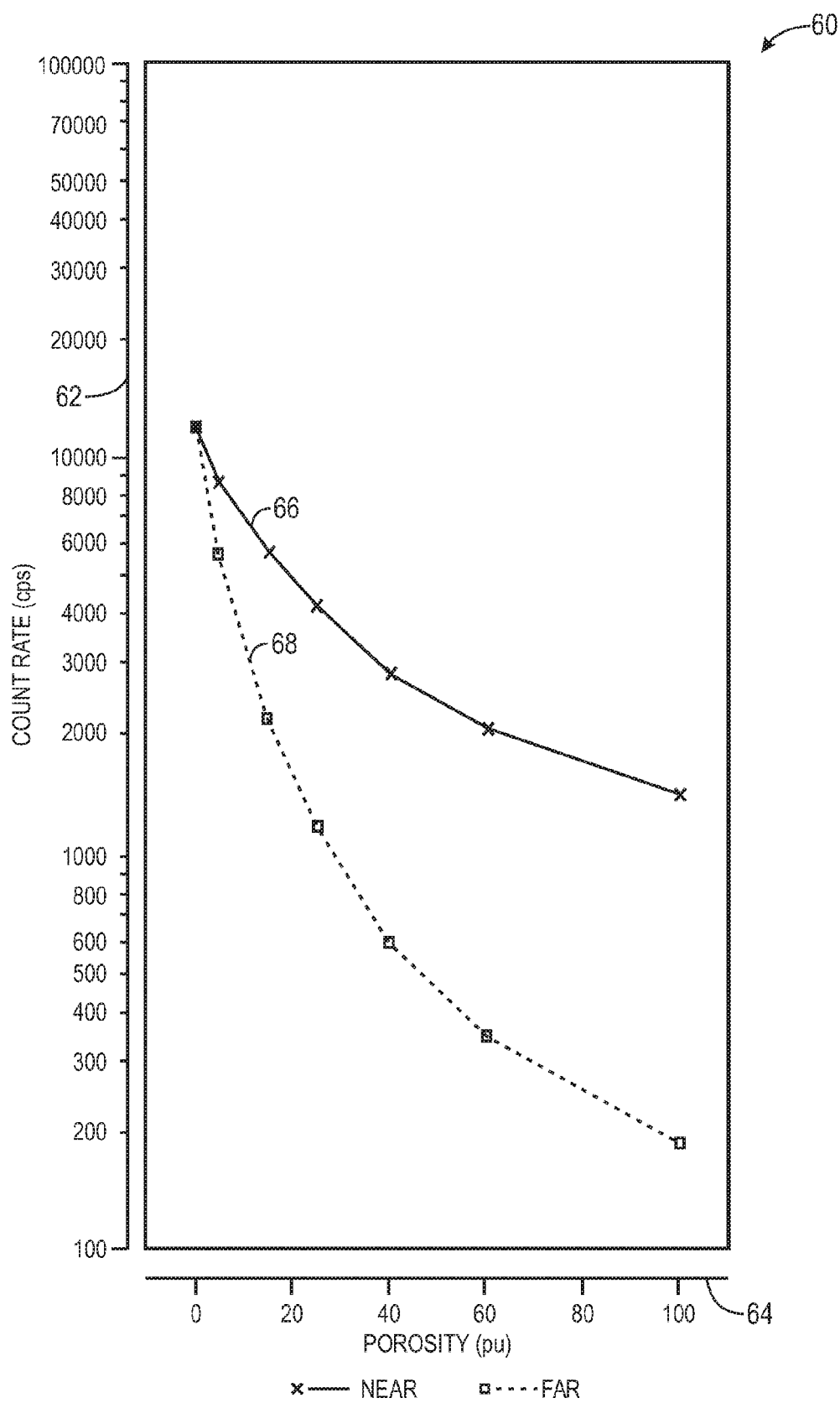
FIG. 4 is a plot modeling a count rate response of a downhole tool having an AmBe neutron source.
Figure 5:
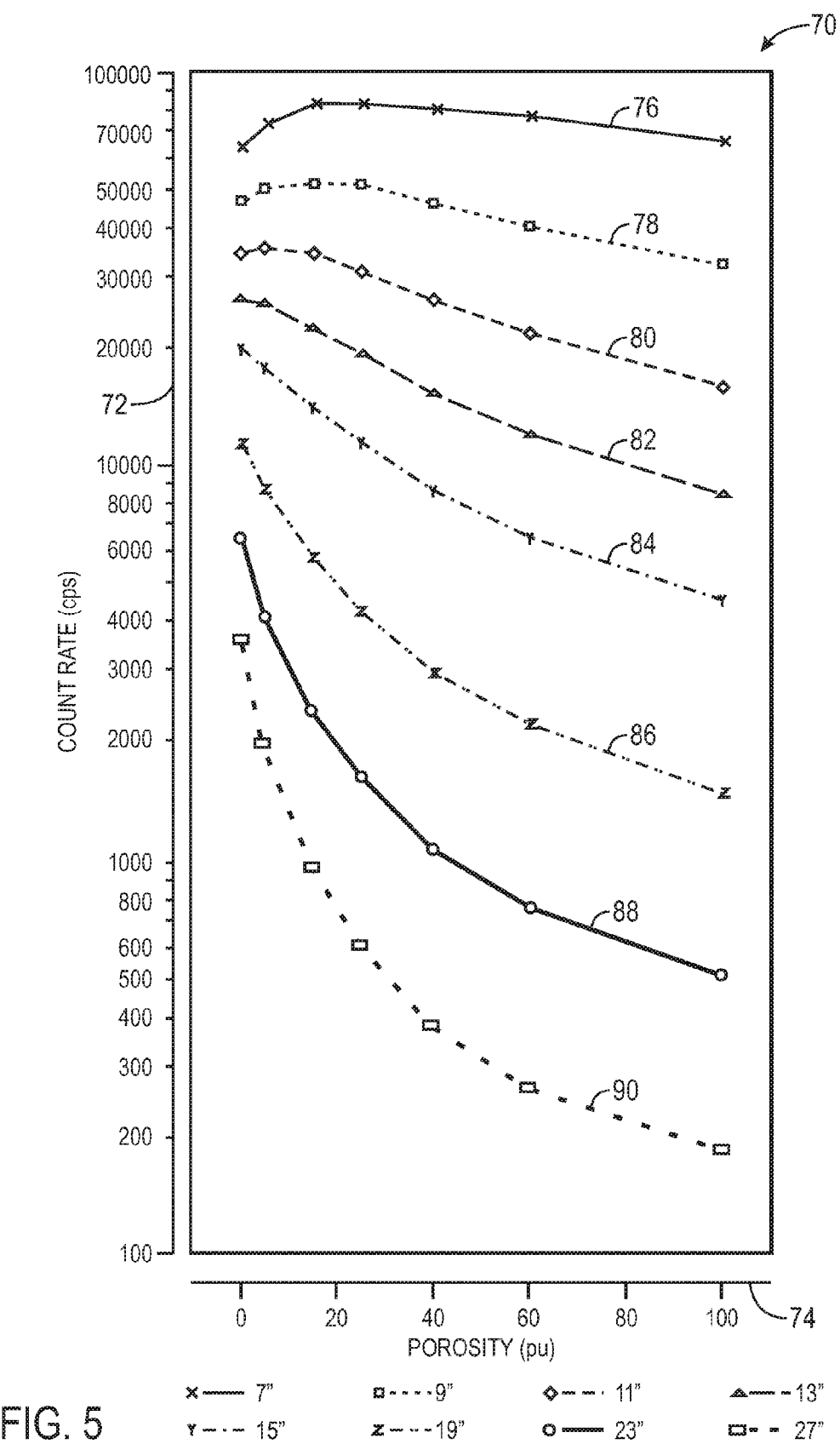
FIG. 5 is a plot modeling a count rate response for a downhole tool having a 14 MeV neutron generator, in accordance with an embodiment.

FIGS. 4 and 5 are plots that respectively model count rate responses of an AmBe neutron well logging downhole tool and count rate responses of the downhole tool 12. Turning to FIG. 4, a plot 60 models the count rate response of neutron detectors of a traditional AmBe neutron well logging downhole tool in a traditional configuration. In the plot 60, an ordinate 62 representing count rate in units of counts per second (cps), and an abscissa 64 represents porosity in units of porosity units (p.u.). Curves 66 and 68 respectively represent the count rates obtained by near and far neutron detectors in a typical AmBe neutron tool. It should be appreciated that these count rates are highly dependent on the strength of the AmBe neutron source and the size and efficiency of the neutron detectors. As noted below, while the absolute count rates may vary, the relative shape of the responses may determine the tool capabilities. In general, in such an AmBe neutron tool, the near neutron detector may be located approximately 1 foot from the AmBe neutron source, while the far neutron detector may be located approximately 2 feet from the AmBe neutron source. As illustrated in the plot 60, the near neutron detector detects significantly more neutrons than the far detector as the porosity of the subterranean formation 36 increases. This relationship provides a basis for determining the porosity of the subterranean formation 36.

FIG. 5 similarly illustrates a plot 70 modeling exemplary count rates for neutron detectors 22 and/or 24 in the downhole tool 12 at various near and/or far spacings from the neutron source 18. In the plot 70, an ordinate 72 represents a neutron count rate in units of counts per second (cps), and an abscissa 74 represents porosity in units of porosity units (p.u.). As shown in the plot 70, curves 76-90 respectively represent exemplary count rate responses for neutron detectors 22 and/or 24 approximately 7 inches, 9 inches, 11 inches, 13 inches, 15 inches, 19 inches, 23 inches, and 27 inches from the neutron source 18. Only curves 82-90, representing neutron detectors spaced 13 inches or further from the neutron source 18, appear to respond in a typical manner, as represented by the curves 66 and 68 of FIG. 4. Indeed, curves 76-80 of FIG. 5 respond in a different manner from that of the curves 66 or 68 of FIG. 4, with the count rate initially increasing as the porosity increases beyond 0 p.u. before dropping as the porosity increases further. The count rate changes relatively little, remaining approximately flat, as porosity increases from 0 p.u. to 100 p.u. Indeed, the maximum count rates illustrated in curves 76 and 78 may differ from their respective minimums by less than approximately 50%.

It is believed that the unusual results of the curves 76-80, and in particular the comparison at similar source detector spacings of curve 80 for tool 12 to curve 66 for a traditional AmBe tool, may relate to the longer average distance traveled by the 14-MeV neutrons 42, 46 from the source 18 until they reach energies low enough to be detected by the neutron detectors 22 and/or 24. When the near neutron detector 22 is located at approximately 10 inches or less from the neutron source 18, and when the subterranean formation 36 has relatively lower porosity, the neutrons 42, 46 emitted from the neutron source 18 will travel a distance which is comparable or larger to the spacing between the neutron source 18 and the neutron detector 22 before reaching an energy that is low enough to be detected. As the porosity increases and the average distance traveled by the neutrons 42, 46 to reach detectable energies decreases, the detectable neutron flux at the near neutron detector 22 will at first increase and then decrease as the porosity increases further. Thus, from examining the plot 70, it would appear that responses by a near neutron detector 22 located 7 inches, 9 inches, or 11 inches from the neutron detector 18 would not provide a useable value for determining the porosity of the subterranean formation 36, in particular in view of the fact that a single count rate can correspond to two different porosity values. However, as described below, when the near neutron detector 22 is located at such near distances, the downhole tool 12 may in fact achieve very high porosity sensitivity.

Figure 6:
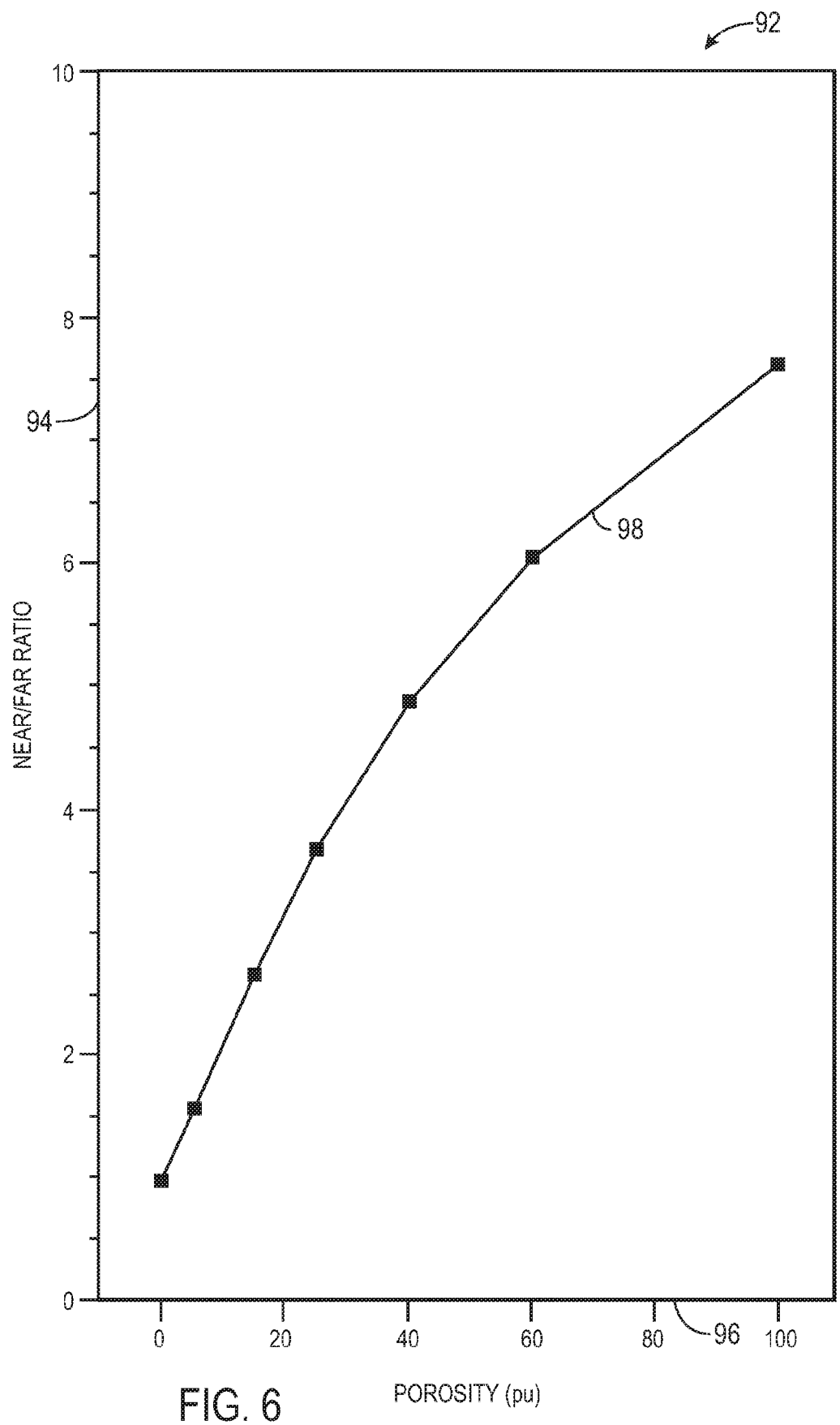
FIG. 6 is a plot modeling a ratio response of a downhole tool having an AmBe neutron source.
Figure 7:
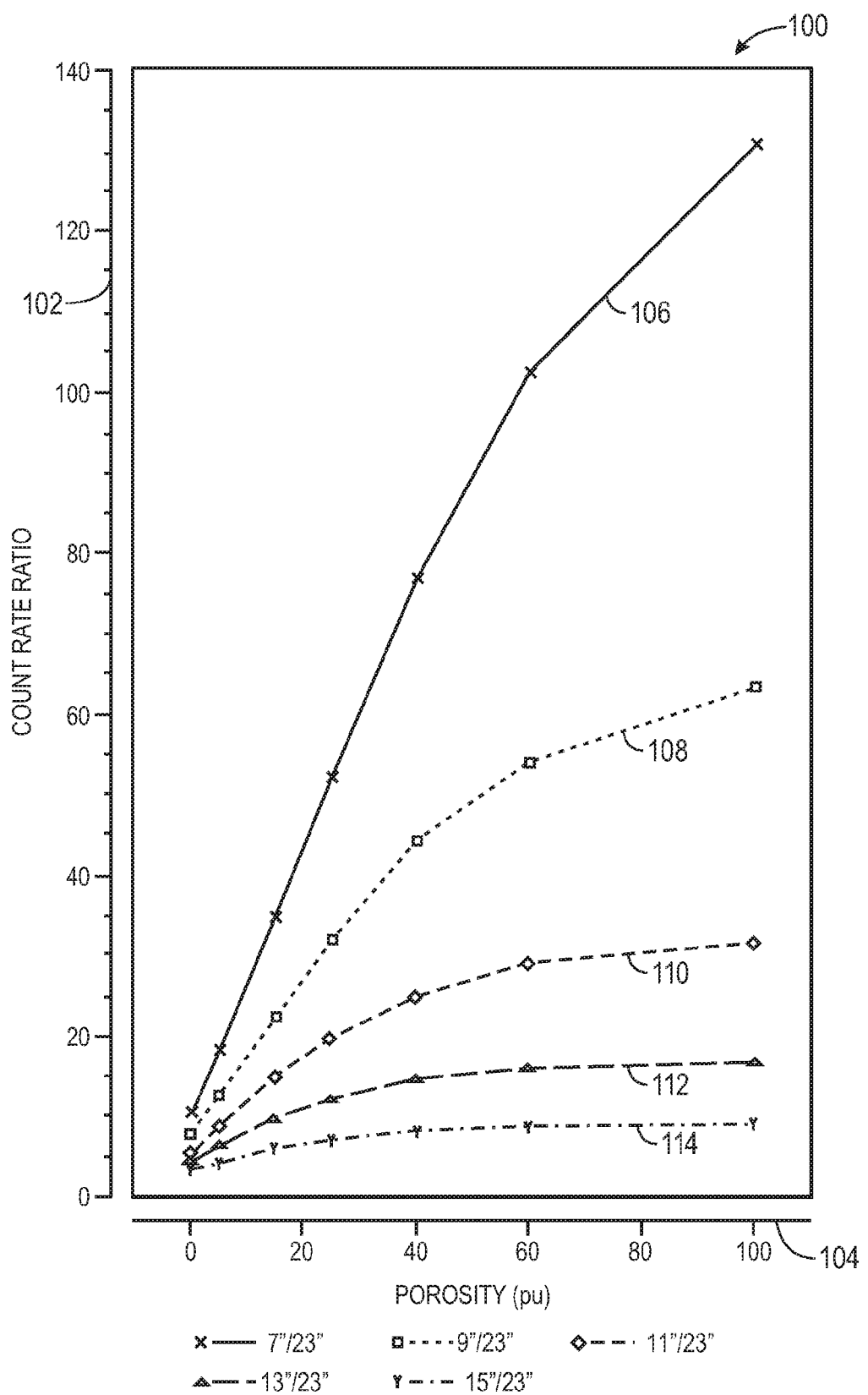
FIG. 7 is a plot modeling a ratio response of a downhole tool having a 14 MeV neutron generator, in accordance with an embodiment.

FIGS. 6 and 7 are plots modeling ratios of responses between a near neutron detector and a far neutron detector of an AmBe downhole tool and a near neutron detector 22 and far neutron detector 24 of the downhole tool 12. Turning to FIG. 6, a plot 92 includes an ordinate 94, representing a ratio of near neutron detector responses to far neutron detector responses in a downhole tool having an AmBe neutron source. An abscissa 96 represents porosity in units of porosity units (p.u.). A curve 98, representing the ratio of near-to-far neutron detector responses, shows a relatively steadily increasing slope that increases with porosity, from about 1 at a porosity of 0 to about 7.5 at a porosity of 100.

FIG. 7 illustrates a plot 100, in which an ordinate 102 represents ratios of responses by near neutron detectors 22 to far neutron detectors 24 at various spacing pairs. An abscissa 104 represents a porosity of a subterranean formation 36 in units of porosity units (p.u.). Curves 106-114 represent count rate ratios for five different pairs of near and far spacings. In all of the curves 106-114, the far spacing of the far neutron detector 24 is 23 inches from the neutron source 18. The near spacings of the near neutron detector 22 for the curves 106-114 are respectively 7 inches, 9 inches, 11 inches, 13 inches, and 15 inches from the neutron source 18. As apparent from curves 106-114 of the plot 100, the near-to-far count rate ratios undergo much larger changes with porosity as the near detector is moved closer.

Figure 8:
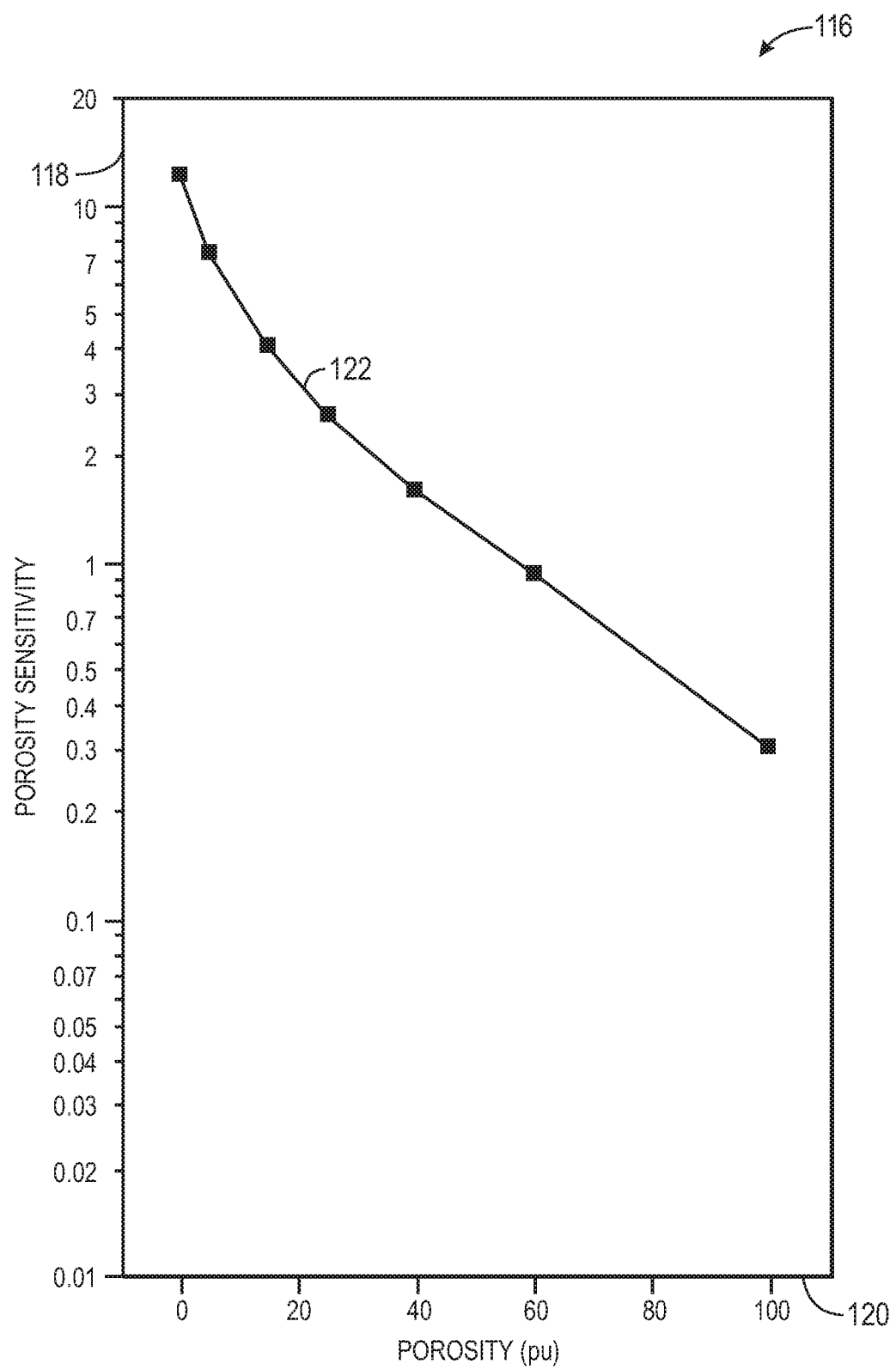
FIG. 8 is a plot modeling a ratio porosity sensitivity of a downhole tool having an AmBe neutron source.
Figure 9:
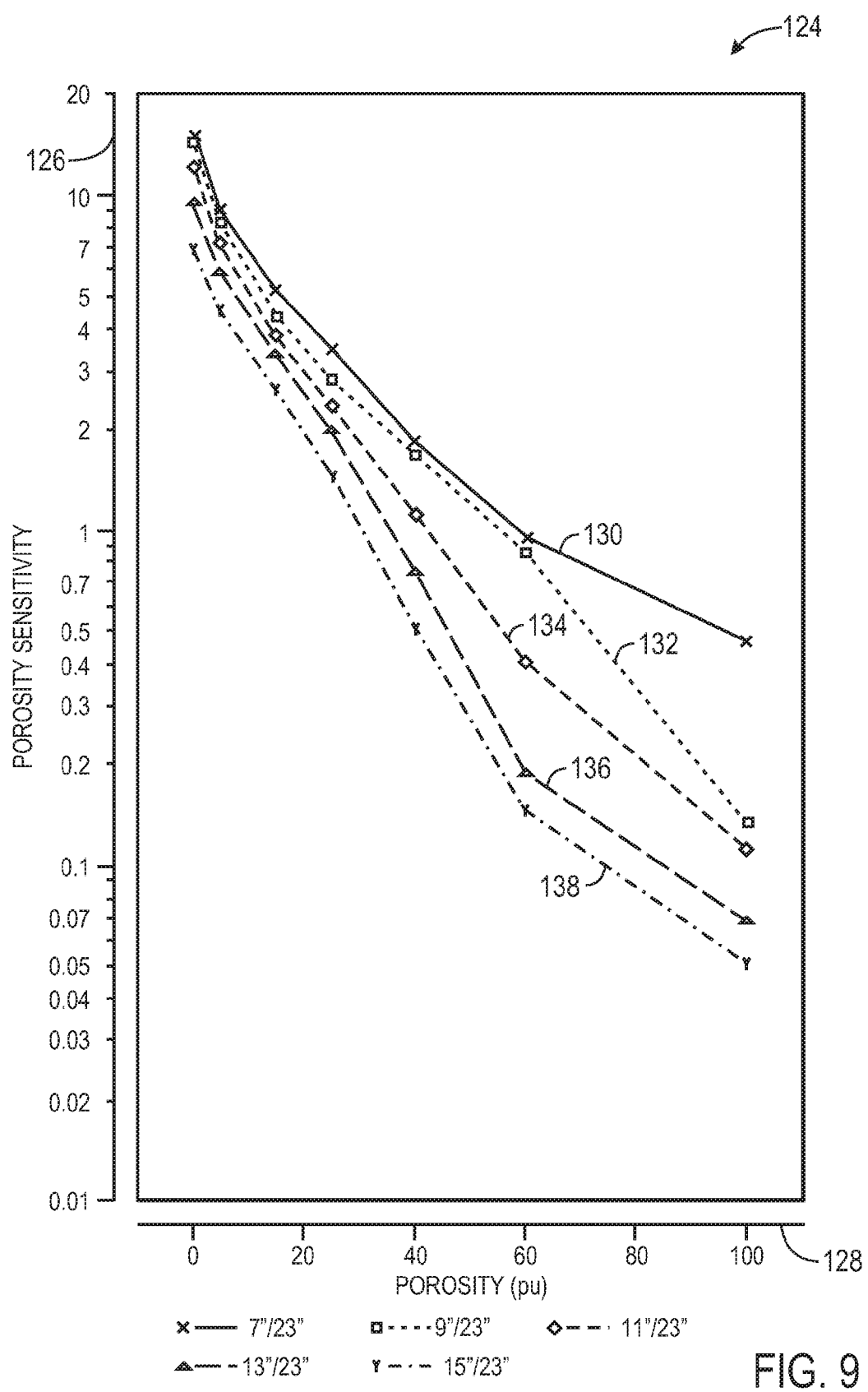
FIG. 9 is a plot modeling a ratio porosity sensitivity for a downhole tool having a 14 MeV neutron generator, in accordance with an embodiment.

This is made clearer in FIGS. 8 and 9, which are plots modeling porosity sensitivities of an AmBe neutron well logging downhole tool and the downhole tool 12. The porosity sensitivities may be understood to be the percentage change in count rate per porosity unit, that is, $$100 \frac{1}{r} \frac{dr}{d\phi},$$

where r is the count rate ratio and $\phi$ is the porosity. Turning to FIG. 8, a plot 116 includes an ordinate 118 illustrating porosity sensitivity on a logarithmic scale of a neutron well logging downhole tool having an AmBe neutron source. An abscissa 120 represents porosity in units of porosity units (p.u.). A curve 122, representing the ratio porosity sensitivity of a near-to-far neutron detector response, shows a logarithmically decreasing slope that steadily decreases with porosity.

FIG. 9 depicts a plot 124, in which an ordinate 126 represents porosity sensitivity on a logarithmic scale of the downhole tool 12. An abscissa 128 represents a porosity of a subterranean formation 36 in units of porosity units (p.u.). Curves 130-138 represent porosity sensitivity for five different pairs of near and far spacings. In all of the curves 130-138, the spacing of the far neutron detector 24 is 23 inches from the neutron source 18. The spacings of the near neutron detector 22 for the curves 130-138 are respectively 7 inches, 9 inches, 11 inches, 13 inches, and 15 inches from the neutron source 18. The data modeled in the plot 124 assumes "standard" well conditions (e.g., a calcite formation, fresh-water-filled porosity, 8 inch fresh-water-filled borehole, 20° C., 1 atm, and so forth).

As may be seen from the plot 124, the porosity sensitivities of detector pairs involving a near spacing of 9 inches or higher (e.g., curves 132-138) have a lower porosity sensitivity at higher porosities than that of an AmBe neutron source downhole tool, as illustrated by the curve 122 of FIG. 8. As apparent from the curve 130, when the near neutron detector 22 is located at 7 inches from the neutron source 18, the downhole tool 12 may in fact have a higher porosity sensitivity at higher porosities than a traditional AmBe neutron source downhole tool. For a given embodiment of the downhole tool 12, the exact optimal near spacing will depend on specific details of the design of the downhole tool 12, including the size and efficiency versus energy of the neutron detector 22, and where, what kind, and how much neutron shielding is used. The near neutron detector 22 may be spaced such that its response may be relatively flat as porosity increases. This region is likely to be less than one foot from the neutron source 18, with less than 9 inches between the neutron source 18 and the front face of the near neutron detector 22 probably optimal, and very small spacing possibly excluded due to other design considerations.

Certain other environmental factors, such as the size of the borehole 38, may affect the number of neutrons 46 that may be detected by the near and far neutron detectors 22 and 24. As such, the ratios of detected neutrons may change relative to similar ratios determined under the same well conditions, as the size of the borehole changes. Accordingly, the apparent porosity may also change relative to porosities determined under the same well conditions, as the size of the borehole changes.

Figure 10:
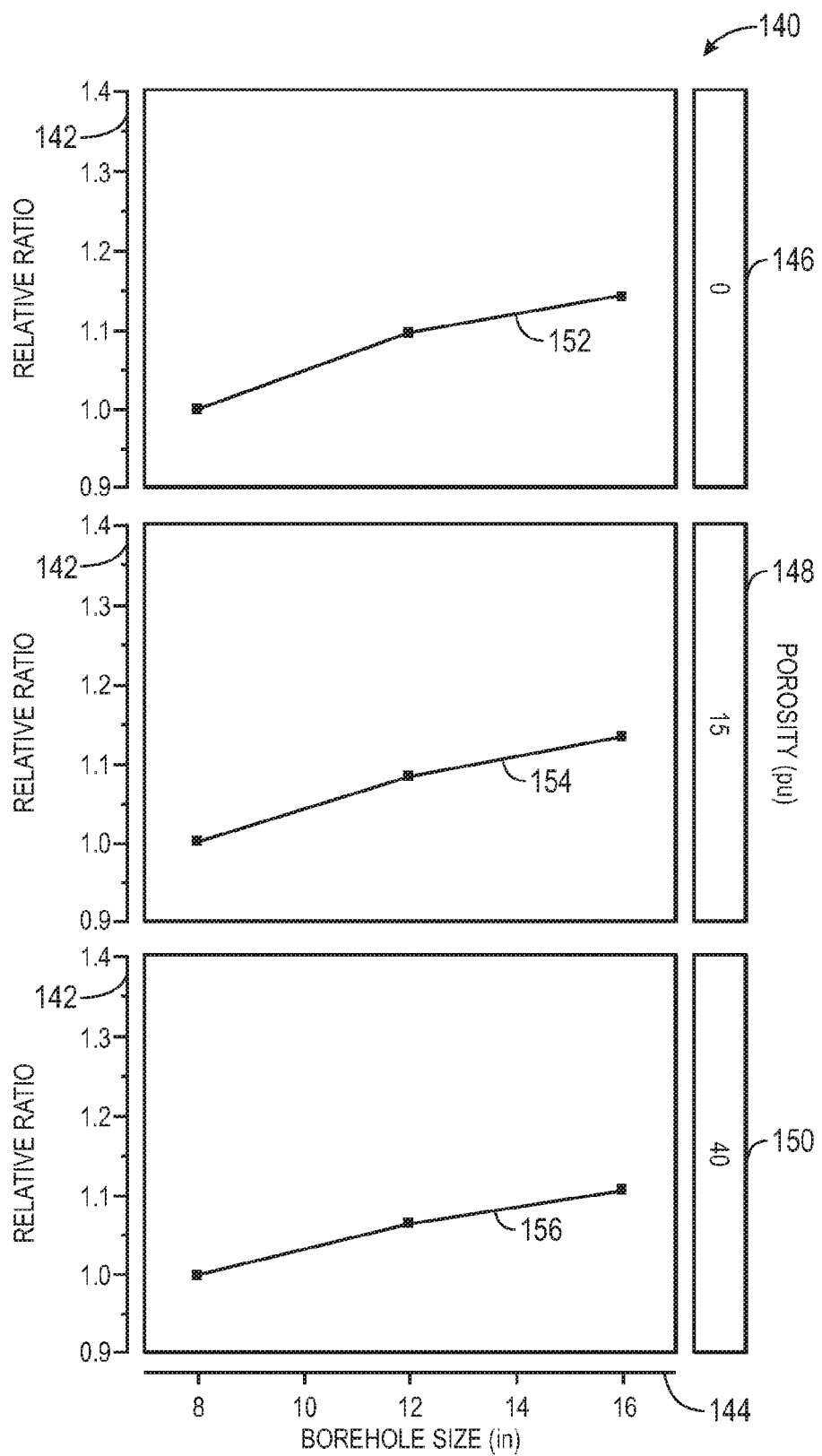
FIG. 10 is a series of plots modeling the effect of borehole size on relative changes in ratio for a downhole tool having an AmBe neutron source.
Figure 11:
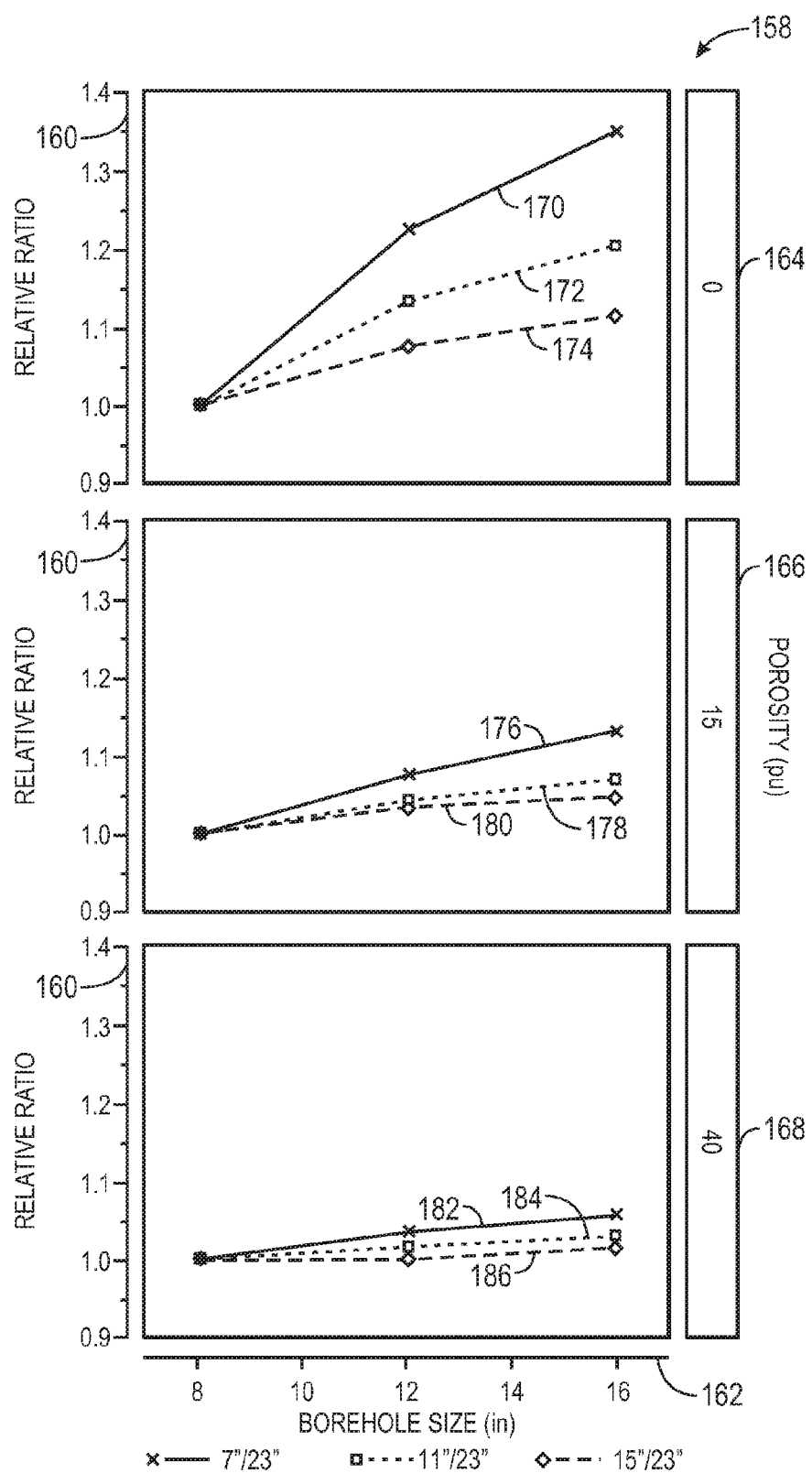
FIG. 11 is a series of plots modeling effects of borehole size on relative changes in ratio for a downhole tool having a 14 MeV neutron generator, in accordance with an embodiment.

FIGS. 10 and 11 represent series of plots modeling the effect of borehole size on relative changes of ratios obtained by an AmBe neutron well logging downhole tool and the downhole tool 12. Turning to FIG. 10, a series of plots 140 each include an ordinate 142 representing the relative change in ratio for a neutron well logging downhole tool having an AmBe neutron source. An abscissa 144 represents borehole size in units of inches (in.). The series of plots 140 respectively model three distinct porosities 146-150 in units of porosity units (p.u.) (0 p.u., 15 p.u., and 40 p.u.). Curves 152-156 illustrate that as borehole size increases, the relative change in ratio from a downhole tool having an AmBe neutron source steadily increases.

FIG. 11 illustrates a series of plots 158, each of which includes an ordinate 160 representing the relative change in ratio for certain spacings of near neutron detector 22 and far neutron detector 24 pairs in the downhole tool 12. An abscissa 162 represents borehole size in units of inches (in.). The series of plots 158 respectively model three distinct porosities 164-168 in units of porosity units (p.u.) (0 p.u., 15 p.u., and 40 p.u.). As shown by curves 170-174, at a porosity of 0, the nearer that the near neutron detectors 22 are spaced to the neutron source 18, the greater the relative change in detector ratios. Indeed, as illustrated by the curve 170, when the near neutron detector 22 is spaced 7 inches from the neutron source 18, the relative change in ratio may be substantially worse than that of a typical AmBe neutron source downhole tool. As respectively shown by curves 176-180 and curves 182-186, as the porosity increases, the effect of borehole size on relative changes in ratio may be smaller than that of a typical AmBe neutron source downhole tool.

Figure 12:
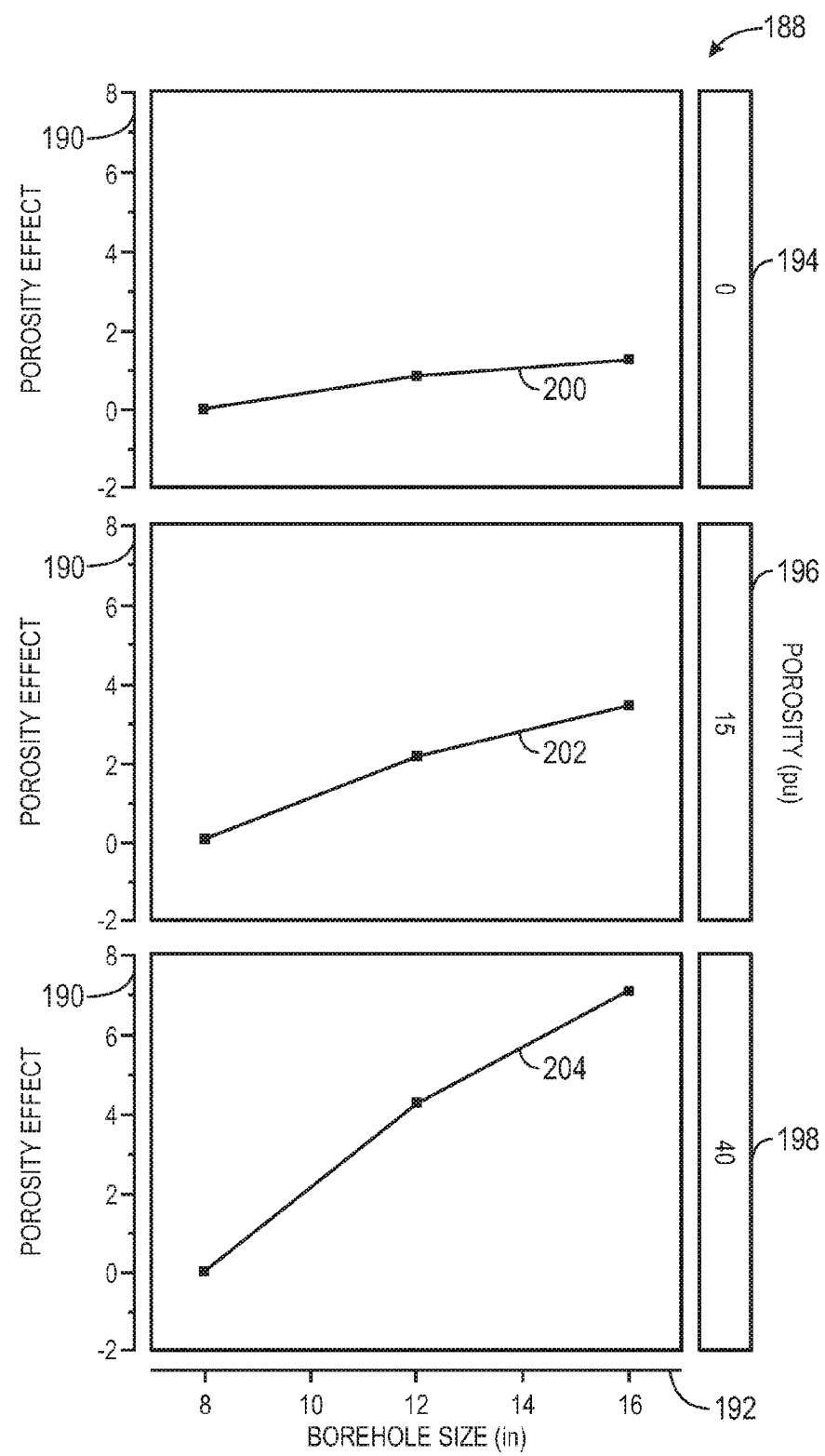
FIG. 12 is a series of plots modeling an effect of borehole size on porosity for a downhole tool having an AmBe neutron source.
Figure 13:
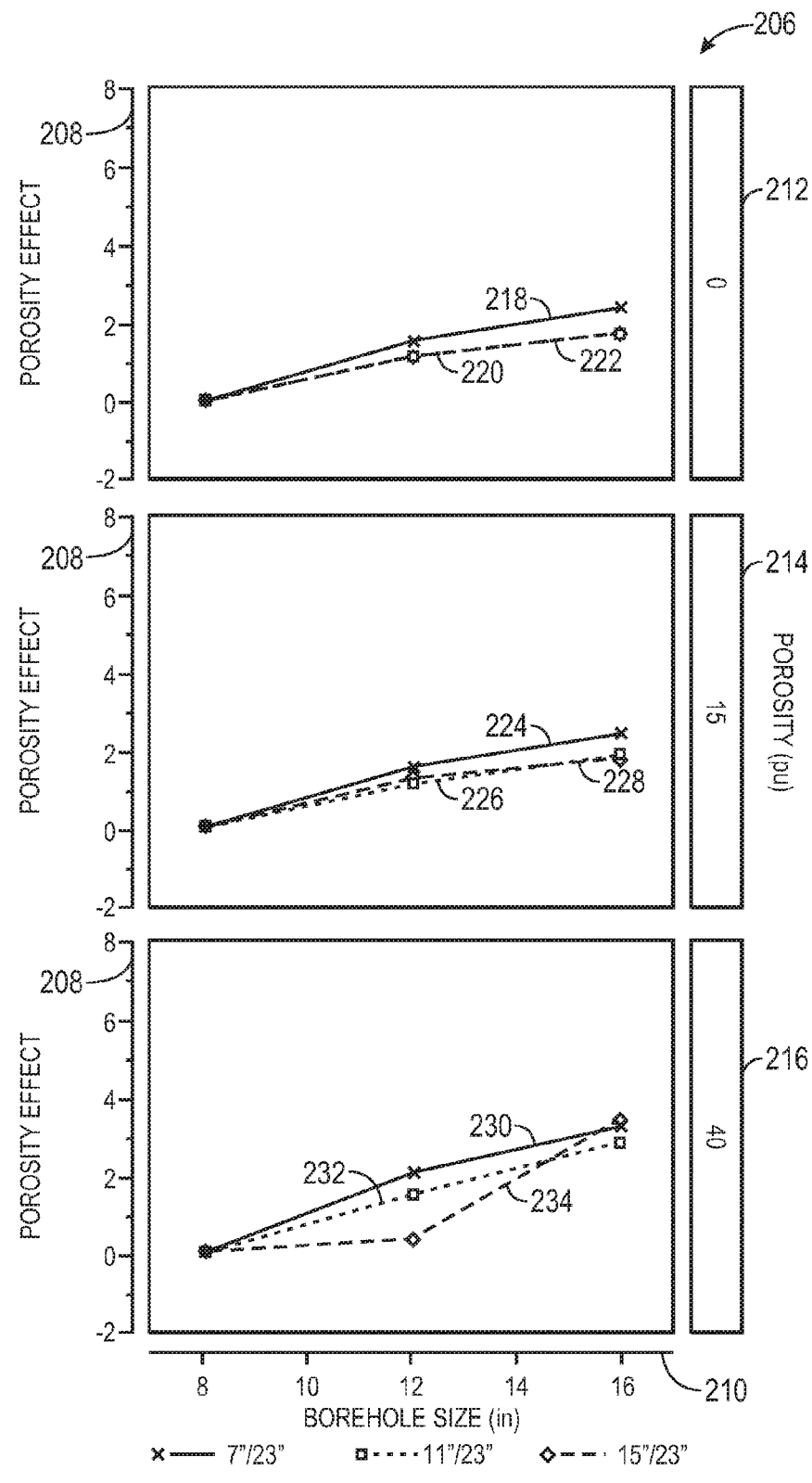
FIG. 13 is a series of plots modeling effects of borehole size on porosity for a downhole tool having a 14 MeV neutron generator, in accordance with an embodiment.

FIGS. 12 and 13 represent series of plots modeling the change in apparent porosity (porosity effect) as a function of borehole size for an AmBe neutron well logging downhole tool and the downhole tool 12. Turning to FIG. 12, a series of plots 188 each include an ordinate 190 representing change in porosity for a neutron well logging downhole tool having an AmBe neutron source. An abscissa 192 represents borehole size in units of inches (in.). The series of plots 188 respectively model three distinct porosities 194-198 in units of porosity units (p.u.) (0 p.u., 15 p.u., and 40 p.u.). Curves 200-204 illustrate that as borehole size and/or porosity increase, the change in porosity from a downhole tool having an AmBe neutron source also steadily increases.

FIG. 13 illustrates a series of plots 206, each of which includes an ordinate 208 representing the change in apparent porosity for certain spacings of near neutron detector 22 and far neutron detector 24 pairs in the downhole tool 12. An abscissa 210 represents borehole size in units of inches (in.).

The series of plots 206 respectively model three distinct porosities 212-216 in units of porosity units (p.u.) (0 p.u., 15 p.u., and 40 p.u.). As shown by curves 218-222, 224-228, and 230-234, the porosity effect of borehole size is relatively similar for near spacings of the near neutron detector 22 at 0 p.u., 15 p.u., and 40 p.u. As illustrated by a comparison between curves 218-234 of FIG. 13 and curve 200 of FIG. 12, the porosity effect of the downhole tool 12 is comparable to that of a typical AmBe neutron source downhole tool.

In addition to borehole size, a salinity of the subterranean borehole and/or formation fluid 34 may also affect the number of neutrons detected by different neutron detectors. This may occur because chlorine nuclei in salt may capture neutrons that have lost energy due to various interactions 44 with elements of the subterranean fluid 34. As such, thermal neutrons 46 that might otherwise be detected by the neutron detectors 22 or 24 may be captured before detection may occur. Thus, the ratio of detected neutrons 46 may vary from standard well conditions and, accordingly, the apparent porosity may also vary from the standard well conditions.

Figure 14:
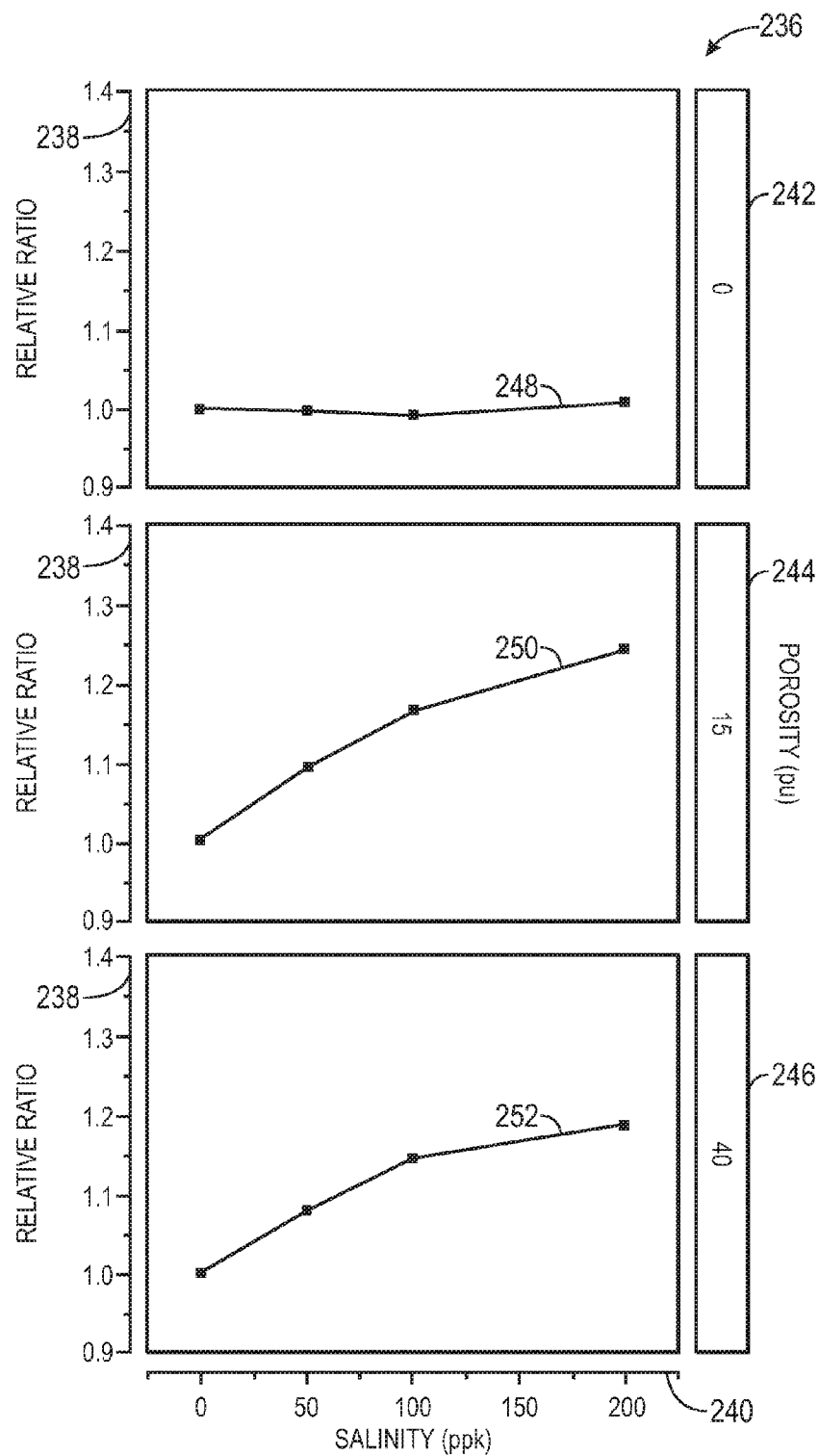
FIG. 14 is a series of plots modeling a salinity effect on relative changes in ratio for a downhole tool having an AmBe neutron source.
Figure 15:
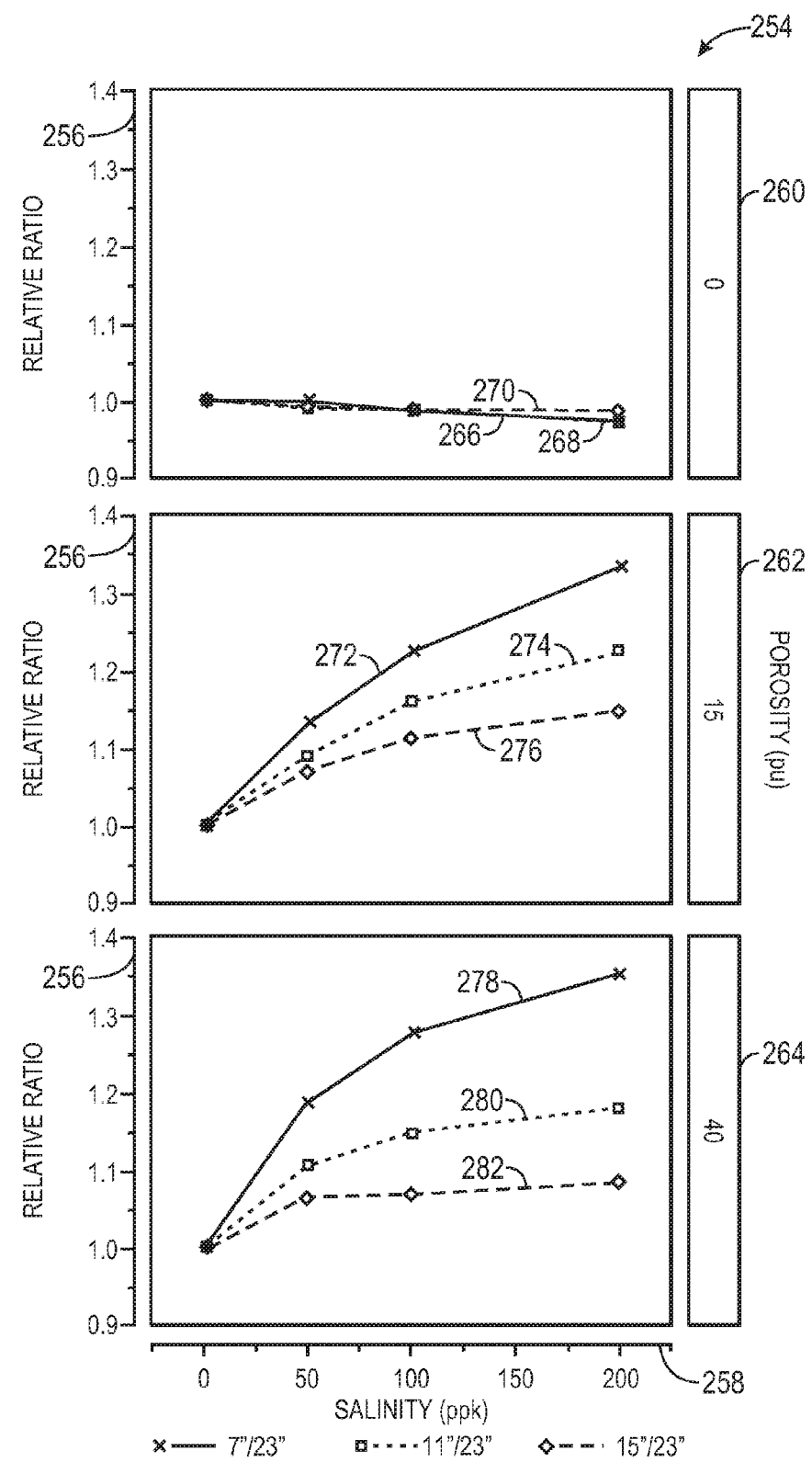
FIG. 15 is a series of plots modeling a salinity effect on relative changes in ratio for a downhole tool having a 14 MeV neutron generator, in accordance with an embodiment.

FIGS. 14 and 15 represent series of plots modeling the relative change in ratio (relative ratio) as a function of salinity, where the salinity of the borehole and formation fluids are taken to be equal, for an AmBe neutron well logging downhole tool and the downhole tool 12. Turning to FIG. 14, a series of plots 236 each include an ordinate 238 representing a relative change in ratio for a neutron well logging downhole tool having an AmBe neutron source. An abscissa 240 represents salinity in units of parts per thousand (ppk). The series of plots 236 respectively model three distinct porosities 242-246 in units of porosity units (p.u.) (0 p.u., 15 p.u., and 40 p.u.). Curves 248-252 illustrate that as salinity increases, the change in ratio from a downhole tool having an AmBe neutron source also steadily increases except at 0 p.u. where the effect is minimal.

FIG. 15 illustrates a series of plots 254, each of which includes an ordinate 256 representing the relative change in ratio for certain spacings of near neutron detector 22 and far neutron detector 24 pairs in the downhole tool 12. An abscissa 258 represents salinity in units of parts per thousand (ppk). The series of plots 254 respectively model three distinct porosities 260-264 in units of porosity units (p.u.) (0 p.u., 15 p.u., and 40 p.u.). As shown by curves 266-270, the relative change in ratio for the downhole tool 12 may be largely unchanged at 0 p.u. as salinity increases like the AmBe neutron source downhole tool. From curves 272-276 and 278-282, it may be seen that at higher porosities, the relative change in ratio obtained by the downhole tool 12 may increase with salinity at a faster rate than a traditional AmBe neutron source downhole tool.

Figure 16:
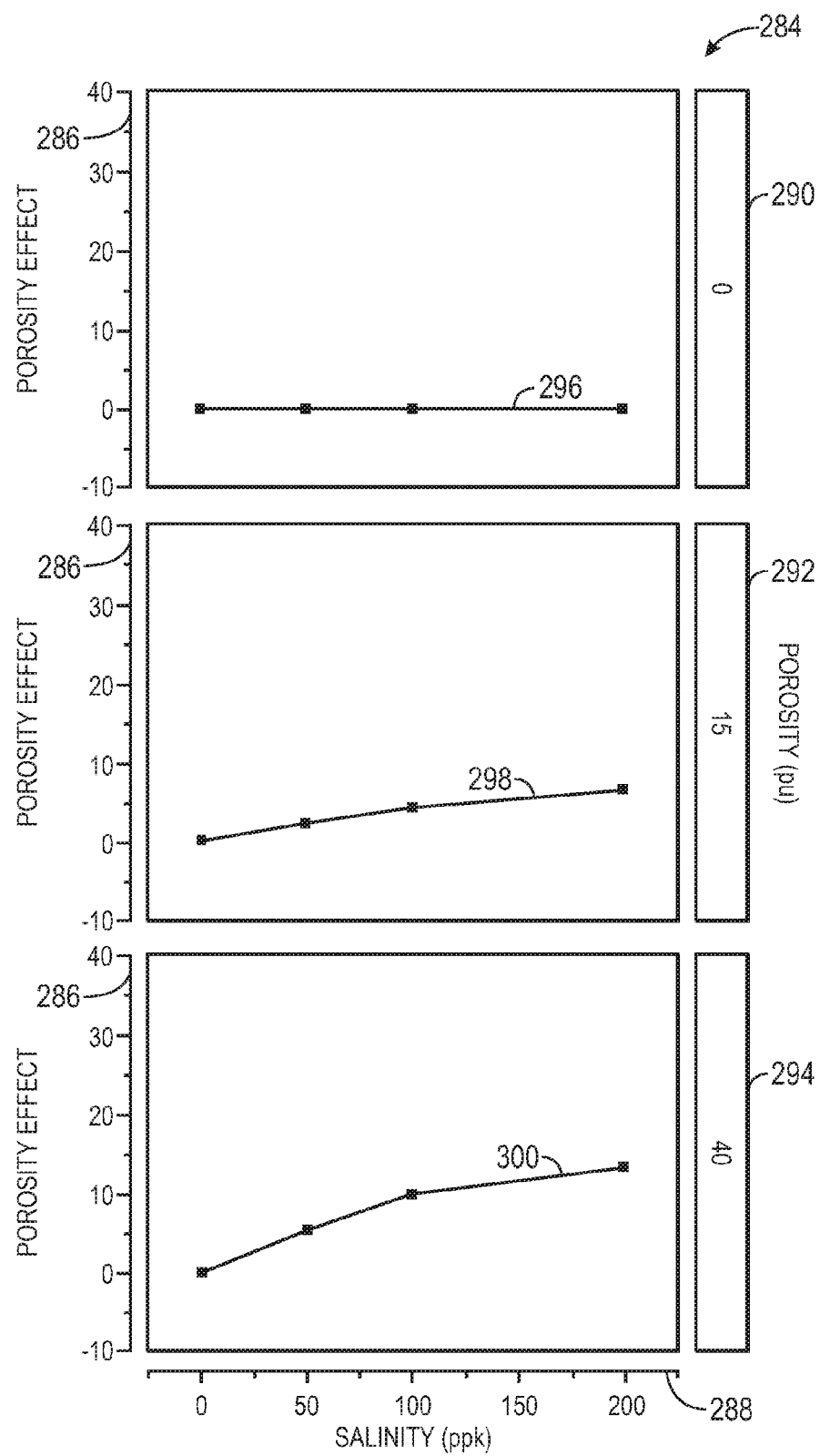
FIG. 16 is a series of plots modeling a salinity effect on porosity for a downhole tool having an AmBe neutron source.
Figure 17:
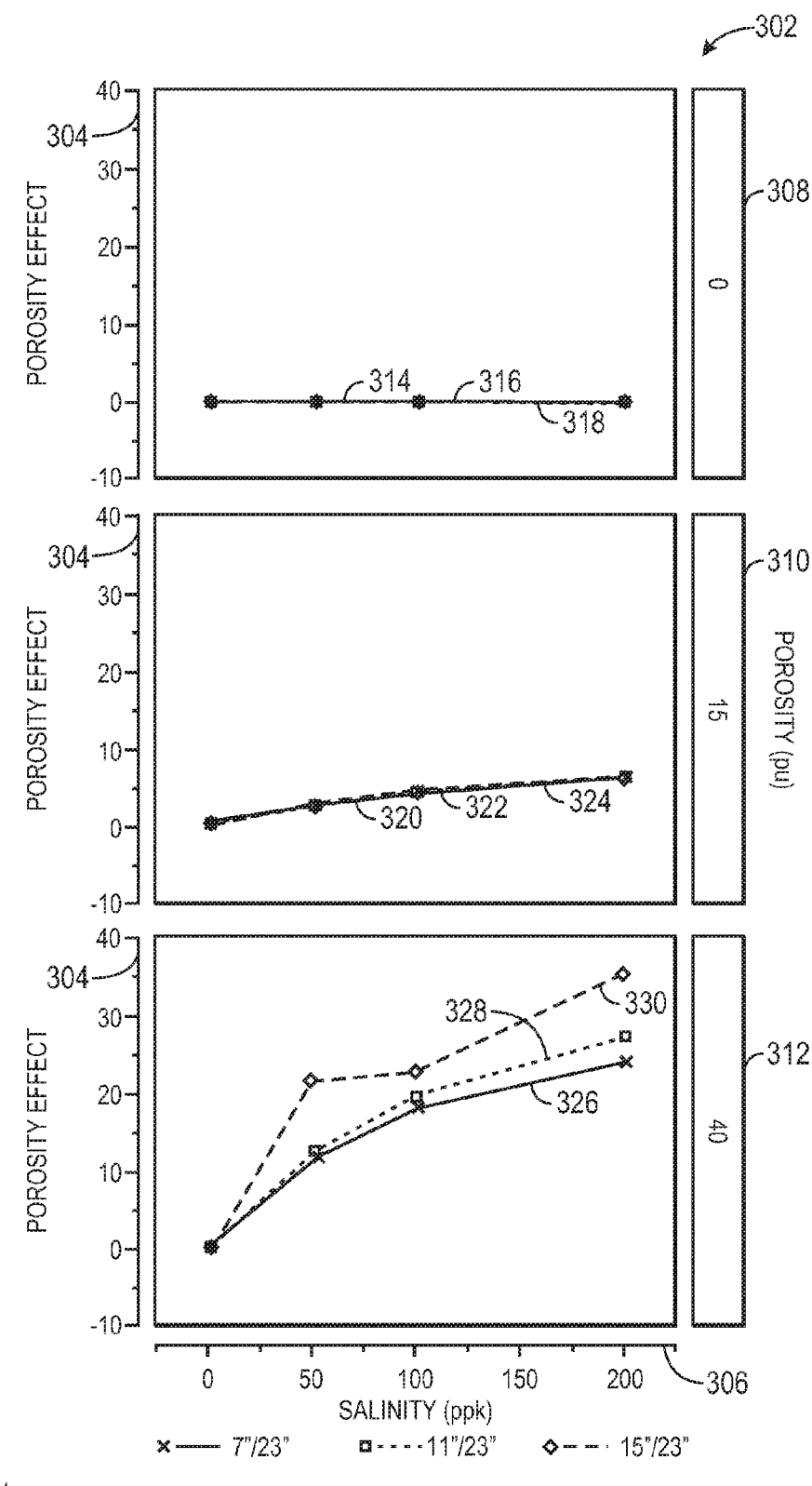
FIG. 17 is a series of plots modeling an effect of salinity on porosity for a downhole tool having a 14 MeV neutron generator, in accordance with an embodiment.

While the modeled performance of the downhole tool 12 may appear to suffer in comparison to a traditional neutron well logging downhole tool with an AmBe neutron source in terms of relative change in ratio, the relative change in porosity calculated from such ratios is less stark. In particular, FIGS. 16 and 17 illustrate series of plots modeling change in porosity (porosity effect) as a function of salinity for an AmBe neutron well logging downhole tool and the downhole tool 12. Turning to FIG. 16, a series of plots 284 each include an ordinate 286 representing a relative change in ratio for a neutron well logging downhole tool having an AmBe neutron source. An abscissa 288 represents salinity in units of parts per thousand (ppk). The series of plots 286 respectively model three distinct porosities 290-294 in units of porosity units (p.u.) (0 p.u., 15 p.u., and 40 p.u.). Curves 296-300 illustrate that as salinity and/or porosity increase, the change in ratio from a downhole tool having an AmBe neutron source also steadily increases.

FIG. 17 illustrates a series of plots 302, each of which includes an ordinate 304 representing the change in porosity measured by certain spacings of near neutron detector 22 and far neutron detector 24 pairs in the downhole tool 12. An abscissa 306 represents salinity in units of parts per thousand (ppk). The series of plots 302 respectively model three distinct porosities 308-312 in units of porosity units (p.u.) (0 p.u., 15 p.u., and 40 p.u.). As shown by curves 314-318, the change in porosity for the downhole tool 12 may be essentially unchanged as salinity increases for 0 p.u. like the traditional AmBe tool. From curves 320-324 and 326-330, it may be seen that at higher porosities, the change in porosity determined by the downhole tool 12 may increase with salinity at a rate that is similar, albeit larger at 40 p.u, to that of a traditional AmBe neutron source downhole tool.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole tool comprising:
   a neutron source configured to emit neutrons into a subterranean formation having a porosity;
   a near neutron detector configured to detect neutrons scattered by the subterranean formation, wherein the near neutron detector is disposed near enough to the neutron source to detect a maximum number of neutrons when the porosity of the subterranean formation is greater than 0 p.u., and wherein the thermal neutron detector is configured substantially not to detect neutrons of greater than 1 keV; and
   a far neutron detector configured to detect neutrons scattered from the subterranean formation, wherein the far neutron detector is disposed a greater distance from the neutron source than the near neutron detector.

2. The downhole tool of claim 1, wherein the neutron source is configured to emit neutrons of greater average energy than neutrons emitted by an AmBe source.

3. The downhole tool of claim 1, wherein the neutron source is configured to emit neutrons of approximately 14 MeV.

4. The downhole tool of claim 1, wherein the neutron source comprises an electronic neutron generator configured to emit neutrons via d-T reactions.

5. The downhole tool of claim 1, wherein the neutron source comprises no radioisotopic neutron source.

6. The downhole tool of claim 1, wherein the near neutron detector comprises a thermal neutron detector.

7. The downhole tool of claim 1, wherein the near neutron detector comprises an epithermal neutron detector.

8. A downhole tool comprising:
   an electronic neutron generator; and
   a thermal neutron detector having an active region, wherein a face of the active region nearest to the electronic neutron generator is disposed less than approximately 10 inches from the electronic neutron generator, and wherein the thermal neutron detector is configured substantially not to detect neutrons of greater than 1 keV.

9. The downhole tool of claim 8, wherein the thermal neutron detector comprises a $^3$He neutron detector.

10. The downhole tool of claim 8, wherein the face of the active region of the thermal neutron detector nearest to the electronic neutron generator is disposed less than approximately 9 inches from the electronic neutron generator.

11. The downhole tool of claim 8, wherein the face of the active region of the thermal neutron detector nearest to the electronic neutron generator is disposed less than approximately 7 inches from the electronic neutron generator.

12. The downhole tool of claim 8, comprising a neutron shield disposed between the electronic neutron generator and the thermal neutron detector.

13. A method comprising:
lowering a downhole tool into a subterranean formation having a porosity;
emitting neutrons from a neutron source of the down hole tool into the subterranean formation;
detecting counts of neutrons scattered by the subterranean formation using a near neutron detector and a far neutron detector of the downhole tool, wherein the far neutron detector is located further from the neutron source than the near neutron detector and the near neutron detector is located near enough to the neutron source to detect a maximum number of neutrons when the porosity of the subterranean formation is greater than 0 p.u., and wherein the thermal neutron detector is configured substantially not to detect neutrons of greater than 1 keV; and
determining a property of the subterranean formation, using data processing circuitry configured to receive the counts of the neutrons detected by the near neutron detector and the far neutron detector, based at least in part on the counts of the neutrons.

14. The method of claim 13, wherein the emitted neutrons have a higher average energy than neutrons emitted by an AmBe source.

15. The method of claim 13, wherein detecting the counts of the neutrons comprises detecting thermal neutrons that have been scattered by the subterranean formation.

16. A system comprising:
a downhole tool having a neutron source configured to emit neutrons of higher average energy than an AmBe neutron source into a subterranean formation and a near neutron detector and a far neutron detector configured to detect counts of thermal neutrons that have been scattered by the subterranean formation, wherein the near neutron detector is disposed nearer to the neutron generator than the far neutron detector, wherein the near neutron detector is configured substantially not to detect neutrons of greater than 1 keV, and wherein the near neutron detector is disposed a distance from the neutron source such that, when the downhole tool is placed in the subterranean formation via an 8-inch fresh-water-filled borehole and when the subterranean formation comprises a calcite formation having fresh-water-filled porosity at 20.degree. C. and 1 atm, the near neutron detector detects fewer thermal neutrons at a porosity of 0 p.u. than at a higher porosity; and
data processing circuitry configured to determine a porosity of the subterranean formation based at least in part on a ratio of a count of thermal neutrons detected by the near neutron detector to a count of thermal neutrons detected by the far neutron detector.

17. The system of claim 16, wherein the near neutron detector is disposed relative to the neutron source such that, when the downhole tool is placed in the subterranean formation via the 8-inch fresh-water-filled borehole and when the subterranean formation comprises the calcite formation having fresh-water-filled porosity at 20.degree. C. and 1 atm, the near neutron detector detects fewer thermal neutrons at a porosity of 0 p.u. than at 10 p.u.

18. The system of claim 16, wherein the near neutron detector and the far neutron detector are disposed relative to the neutron source such that, when the downhole tool is placed in the subterranean formation via the 8-inch fresh-water-filled borehole and when the subterranean formation comprises the calcite formation having fresh-water-filled porosity at 20.degree. C. and 1 atm, the near neutron detector detects an increasing number of neutrons as the porosity increases from 0 p.u. before detecting a decreasing number of neutrons as the porosity increases further.

19. A downhole neutron porosity tool comprising:
a neutron source configured to emit neutrons into a subterranean formation;
a near neutron detector configured to detect neutrons scattered from the subterranean formation, wherein a face nearest to the neutron source of an active region of the near neutron source is disposed at a first distance from the neutron source, wherein the near neutron detector is configured substantially not to detect neutrons of greater than 1 keV, wherein the first distance is selected such that the near neutron detector detects a maximum number of neutrons when the subterranean formation has a first porosity and a minimum number of neutrons when the subterranean formation has a second porosity, wherein the minimum number of neutrons is more than 50% of the maximum number of neutrons; and
a far neutron detector configured to detect neutrons scattered from the subterranean formation, wherein a face nearest to the neutron source of an active region of the far neutron detector is at a second distance from the neutron source, wherein the second distance is greater than the first distance.

20. The downhole tool of claim 19, wherein the neutron source comprises an electronic neutron generator capable of emitting 14 MeV neutrons.

21. The downhole tool of claim 19, wherein the first distance is less than approximately 10 inches and the second distance is greater than approximately 15 inches.

22. The downhole tool of claim 19, wherein the first distance is less than approximately 7 inches and the second distance is greater than approximately 15 inches.

* * * * *